United States Patent [19]

Guerrera et al.

[11] Patent Number: 4,825,347

[45] Date of Patent: Apr. 25, 1989

[54] PULSE WIDTH MODULATION CONTROL CIRCUIT

[75] Inventors: Nunzio Guerrera, St. Leonard; Lorenzo Cividino, Pierrefonds, both of Canada

[73] Assignee: Unisys Corporation, Blue Bell, Pa.

[21] Appl. No.: 92,555

[22] Filed: Sep. 3, 1987

[51] Int. Cl.$^4$ ............................................. H02M 1/14
[52] U.S. Cl. ...................................... 363/41; 363/21; 363/26
[58] Field of Search ................. 363/21, 26, 78, 79, 363/41, 95, 97; 323/283, 286; 307/265

[56] References Cited

U.S. PATENT DOCUMENTS

| | | | |
|---|---|---|---|
| 3,959,711 | 5/1976 | Greenhalgh | 363/41 |
| 4,013,939 | 3/1977 | Biess et al. | 323/286 |
| 4,334,186 | 6/1982 | Sasayama et al. | 323/283 X |
| 4,351,020 | 9/1982 | Leti et al. | 363/26 |
| 4,477,867 | 10/1984 | Pellegrino | 363/26 |
| 4,622,627 | 11/1986 | Rodriguez et al. | 363/21 X |
| 4,628,429 | 12/1986 | Walker | 363/21 |
| 4,672,518 | 6/1987 | Murdock | 363/21 |
| 4,680,688 | 7/1987 | Inou et al. | 363/21 |
| 4,700,285 | 10/1987 | Szepesi | 363/97 |

FOREIGN PATENT DOCUMENTS 0128870 7/1985 Japan ....................... 363/41

*Primary Examiner*—Peter S. Wong
*Assistant Examiner*—Kristine Peckman
*Attorney, Agent, or Firm*—Gordon K. Harris, Jr.; Glenn W. Bowen

[57] ABSTRACT

A pulse width modulation control circuit utilizes a retriggerable monostable multivibrator as a high speed comparator which compares a reference waveform with a control signal level to effect variable termination of modulated output pulses. The control circuit finds particular applicability to pulse width modulated switched mode power supplies.

10 Claims, 3 Drawing Sheets

PULSE WIDTH MODULATION CONTROL CIRCUIT

BACKGROUND OF THE INVENTION

The invention relates generally to control circuitry for generating a train of time width modulated pulse signals. More specifically, the invention concerns pulse generation usable with the power switching elements of switched mode power supplies.

Switching mode power supplies conventionally control or regulate output voltage amplitude by varying the length of time during which an input voltage is applied to the primary circuit of a power supply transformer. The removal and application of the input voltage is controlled by an electronic switching element such as a power transistor. To regulate the output voltage of the supply, the duty cycle of the power switching transistor is varied while maintaining a constant pulse repetition rate. Typically the modulation of the pulse width is effected by initiating a pulse with a signal from a clock pulse train generating circuit, generating an error signal by comparing the power supply output to a first reference level, superimposing a periodically increasing waveform such as a sawtooth upon the error signal and comparing the superimposed signal with a second reference level. The pulse is then terminated by the comparator output whenever the superimposed signal exceeds the second reference level.

Typically such power supply regulator circuits have conventionally employed analog comparators for determining the time at which the superimposed error signal/ramp composite exceeds a preselected reference. Such analog comparators are relatively slow, consume excessive power and often require additional suppression circuitry to eliminate unwanted transients (sometimes called "double pulsing") at the pulse width modulation output. Double pulsing is caused by ringing of the superimposed signal about the preselected reference level. Ringing is, in turn, caused by feedback noise generated by the power switches in the supply utilizing the pulse width modulation control. While recently introduced analog comparators exhibit improved operation speed characteristics, they do so only at a substantial increase in price.

Therefore, there is a perceived need for a low cost, high speed, low power consuming comparator for use in a pulse width modulation control circuit not requiring additional circuitry for effecting double pulse suppression.

SUMMARY OF THE INVENTION

Accordingly, a monostable multivibrator circuit is arranged to function as a high speed comparator in a pulse width modulation control arrangement which can be used for both voltage and peak current mode control applications with switching mode power supplies.

It is a feature of the invention that the pulse width modulation circuit provided thereby offers higher frequency operation with lower power consumption when compared to prior art approaches utilizing conventional analog comparators in the power supply output regulation control loop.

It is a further feature of the invention that additional circuitry for effecting double pulse suppression in voltage mode regulators is not required.

BRIEF DESCRIPTION OF THE DRAWING

These and other objects and features of the invention will become apparent from a reading of a description of a preferred embodiment taken in conjunction with the drawing, in which.

DETAILED DESCRIPTION

Figure 1:
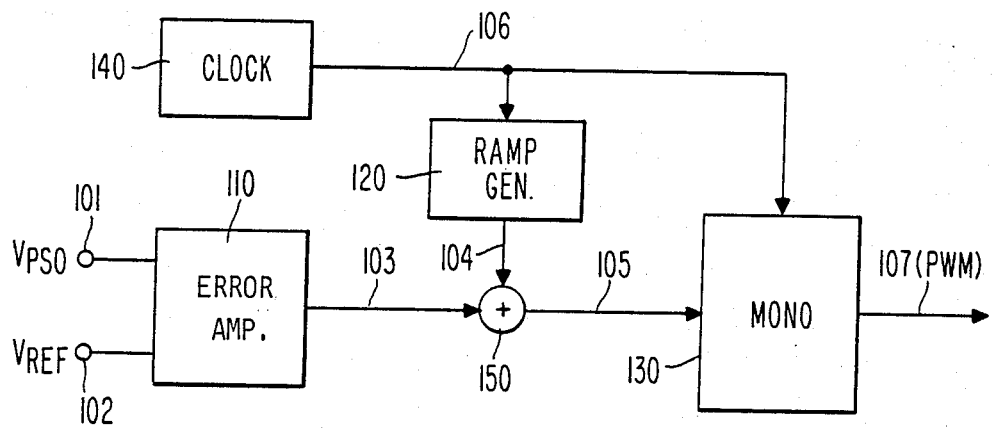
FIG. 1 is a functional block diagram of pulse width modulation control circuitry arranged in accordance with the principles of the invention.

With reference to FIG. 1, the pulse width modulation control arrangement comprises clock 140 for generating a series of pulses having a fixed repetition rate, the clock pulse spacing defining the upper limits of the width of the pulses to be modulated by the control arrangement. Clock 140 is coupled via lead 106 to a ramp generator 120 and a monostable multivibrator 130 connected for operation as a high speed comparator. Ramp generator 120 produces a substantially linear saw-tooth type waveform at its output 104 which is coupled to a summing node 150. An error amplifier 110 receives a feedback signal related to the voltage of the power supply output, $V_{PSO}$, at error amplifier input 101. Error amplifier 110 additionally receives a reference voltage, $V_{REF}$, at lead 102. Error amplifier 110 is operative to produce at its output 103 a voltage proportional to the difference between the reference voltage appearing at input 102 and the feedback signal applied at terminal 101.

Output 103 of error amplifier 110 is coupled to a second input to summing node 150, which superimposes the signal at lead 103 upon the sawtooth waveform generated at lead 104 to yield a composite signal at input 105 to monostable multivibrator 130. As connected, multivibrator 130 is operative to compare the varying signal on input 105 with an internally generated reference voltage Viref and to terminate a pulse initiated by receipt of a clock pulse via lead 106 whenever the variable signal on lead 105 exceeds the internally generated reference Viref. In this manner, the time widths of the pulses appearing at output 107 of monostable multivibrator 130 are pulse width modulated.

Use of a high speed integrated circuit implementation of a monostable multivibrator as the comparator in a pulse width modulation control system enables use of the system at frequencies higher than can be used with more conventional analog comparators. It has been found, for example, that a control arrangement as set forth in FIG. 1 (and described in more detail with reference to FIG. 3 in a later section of this description) can obtain a 95% controllable duty cycle when the circuit is operating at about one megahertz. At such a high frequency, prior art analog components would only yield 85% controllable duty cycle due to the inherent delay in rise times of the components involved.

Figure 3:
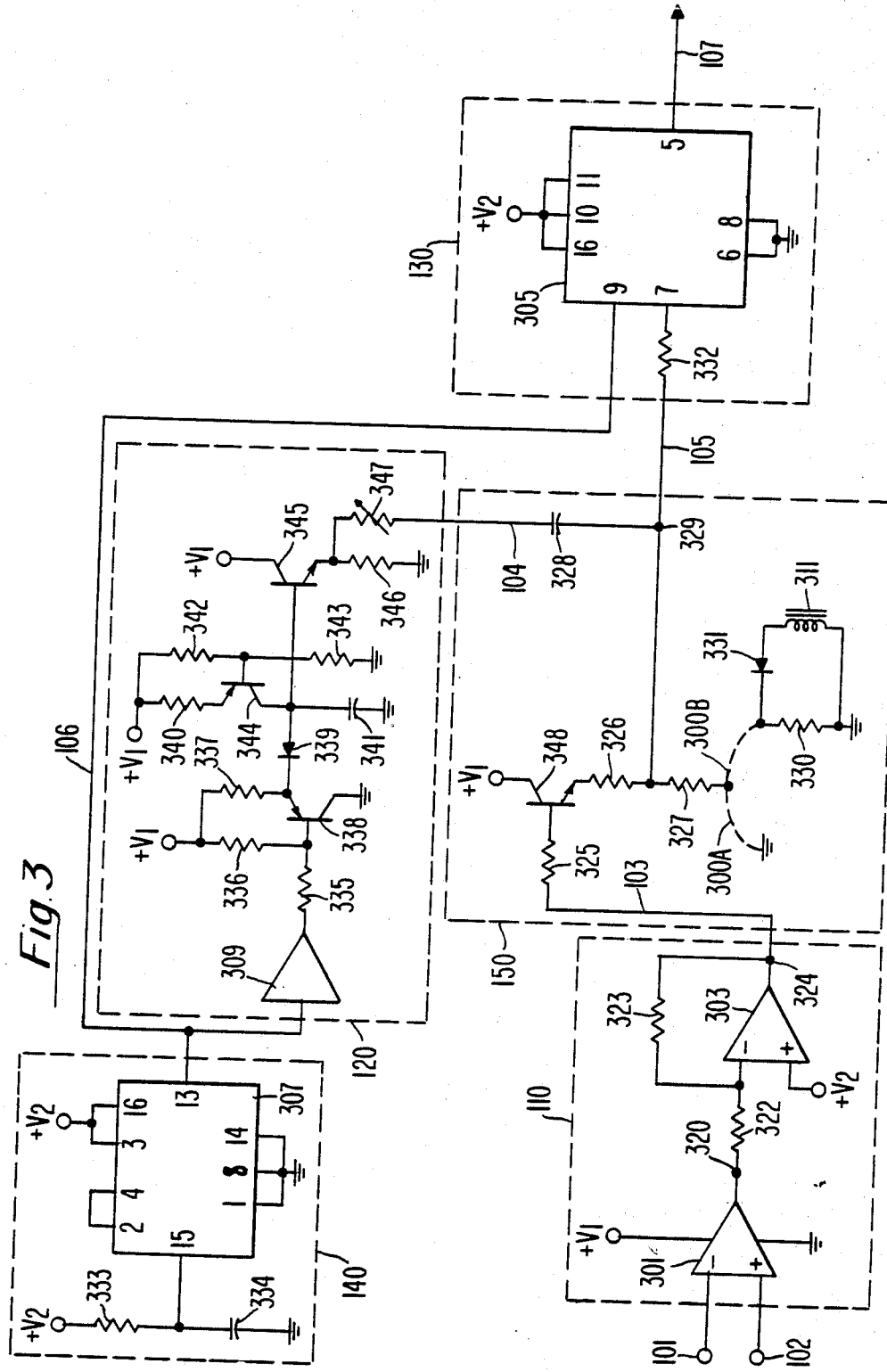
FIG. 3 is a circuit schematic setting forth the elements of the functional blocks of FIG. 1 in more detail.

A more detailed depiction of the pulse width modulation control arrangement of FIG. 1 is set out in FIG. 3, with the components belonging to each functional block of FIG. 1 depicted in FIG. 3 within dashed lines representing the same functional blocks set forth in FIG. 1. Clock pulse generator 140 includes free running multivibrator 307 which can take the form, for example, of commercially available integrated circuit type SN74LS123 sold by Texas Instruments, Inc. Multivibrator 307 has a pulse period determining input 15 coupled to a period-defining RC network comprised of resistor 333 coupled between bias voltage $+V_2$ and input pin 15, and capacitor 334 coupled between input pin 15 and ground potential. Pins 1, 8 and 14 of integrated circuit 307 are coupled to ground potential, pins 2 and 4 are interconnected, and pins 3 and 16 are coupled to bias potential $+V_2$. Output pin 13 of integrated circuit 307 carries the clock pulse train of fixed repetition rate which is determined by the resistor 333-capacitor 334 combination. The output of clock generator 140 coupled to pin 13 is connected to ramp generator 120 and retriggerable monostable multivibrator 130 via lead 106.

Ramp generator 120 has its input at 106 buffered by an input amplifier 309. An output of amplifier 309 is coupled to the base of PNP transistor 338 via resistor 335. Additionally, the base of transistor 338 is coupled via resistor 336 to bias potential $+V_1$. The collector of transistor 338 is coupled to ground potential while the emitter os transistor 338 is coupled via resistor 337 to bias potential $+V_1$. The input buffer stage of ramp generator 120 therefore is comprised of operational amplifier 309, resistors 335, 336 and 337 and PNP transistor 338.

The output of the input buffer stage at the emitter of transistor 338 is coupled via diode 339 to an input of a constant current source used to charge rampe slope-determining capacitor 341. The constant current source is comprised of a PNP transistor 334 having its collector coupled to ground potential via a ramp capacitor 341, its emitter coupled via resistance 340 to bias voltage $+V_1$ and its base electrode coupled to a voltage divider comprised of resistor 342 coupled between bias supply $+V_1$ and the base electrode of transistor 334, and resistance 343 which is coupled between the base electrode of transistor 344 and ground potential. The output of the constant current source is taken from the collector of transistor 344 and is coupled to an output buffer stage for isolating the ramp capacitor 341.

The output buffer stage is comprised of NPN transistor 345 which has a base electrode coupled for receipt of the constant current source output, a collector electrode coupled to bias supply $+V_1$ and an emitter electrode coupled to ground via resistor 346 and to a ramp generator output 104 via a ramp adjusting variable resistor 347. Ramp generator output 104 is coupled to summing circuit 150.

A control voltage at lead 103 is generated by error amplifier circuit 110. Error amplifier 110 has a first input 101 coupled for receipt of feedback signal related to the power supply output being regulated by the pulse width modulation control arrangement. A second error amplifier input at 102 is coupled for receipt of a reference signal level. The signals on inputs 101 and 102 have their difference amplified by an error amplifier comprised of operational amplifier 301 and bias supply $+V_1$. Input 101 is coupled to an inverting input of amplifier 301 while the referece signal at lead 102 is coupled to the non-inverting input of amplifier 301. The output of amplifier 301 is coupled at node 320 to an inverter amplifier comprised of resistors 322 and 323, operational amplifier 303 and bias supply $+V_2$. The inverter amplifier input passes via resistor 322 to an inverting input of amplifier 303 while the non-inverting input of amplifier 303 is coupled to bias supply $+V_2$. The inverting input of amplifier 303 is additionally coupled via resistor 323 to output node 324 and thence to the output of the comparator 110 which is coupled via lead 103 to summing circuit 150.

The summing circuit 150 presents the ramp or sawtooth waveform at input 104 to a summing node 329 via a decoupling capacitor 328, while a signal proportional to that present at comparator output 103 is presented to the same summing node via the following elements. Lead 103 is coupled via resistor 325 to the base of NPN transistor 348. A collector electrode of transistor 348 is coupled to bias supply $+V_1$, while the emitter electrode of transistor 348 is coupled to summing node 329 via resistor 326 and, in a voltage mode option method of operation, to ground potential via resistor 327 and option strap 300A. In the voltage mode of operation, option strap 300B is removed.

In a peak current mode of operation of the pulse width control circuitry, option strap 300A is removed and strap 300B installed thereby coupling a current sensing element via resistor 327 to summing node 329. The current sensing element is comprised of a sense winding 311 which is connected in series with the main power supply transformer winding (not shown). Winding 311 has a first terminal coupled to ground potential and a second terminal coupled via diode 331 and resistance 327 to summing node 329. A voltage signal proportional to the sensed current is developed across resistance 330 which is coupled between a cathode electrode of diode 331 and ground potential.

The signal at 329 is therefore a composite comprised of the ramp generator sawtooth output superimposed upon a control voltage proportional to the degree of error between a voltage or current sensed at the power supply output with respect to a predetermined reference voltage. The superimposed signal is coupled via lead 105 to a high speed comparator 130.

Comparator 130 is comprised of a retriggerable, monostable multivibrator integrated circuit, such as type SN74LS123, commercially available from Texas Instruments, Inc. The SN74LS123 actually packages two multivibrators in the same integrated circuit and either of the two may be used for this application. In the embodiment shown in FIG. 3, the multivibrator unit number two of the integrated circuit is used and the pin numbers correspond accordingly, as set forth and described in the data sheet for the device published by Texas Instruments, Inc. Lead 105 is coupled via resistor 332 to pin 7 of multivibrator integrated circuit 305, which is conventionally designated as "$R_{EXT}/C_{EXT}$". The clock pulse train on lead 106 is coupled to pin 9 of integrated circuit 305, conventionally also designated at "A" on the integrated circuit device data sheet. Pin 16 of integrated circuit 305, conventionally designated "$V_{CC}$", pin 10 conventionally designated "B", and pin 11 conventionally designated "CLR" are each connected to bias supply $+V_2$. Integrated circuit pin 6 conventionally designated "$C_{EXT}$", and pin 8, conventionally designated "GND" are coupled to ground potential. The high speed comparator output carrying the pulse width modulated signals at lead 107 is coupled to pin 5 of integrated circuit 305 which is conventionally designated "Q".

Hence, it is seen that an input of the integrated circuit monostable multivibrator which is conventionally coupled to a resistance-capacitance network for defining the period of the multivibrator output pulse is, in the arrangement of the instant invention, coupled instead to the summing node 329 of summing circuit 150. When configured as shown, it has been found that integrated circuit 305 will compare the variable signal appearing at input pin 7 with an internally generated referenced signal Viref and will terminate a positive going pulse appearing at pin 5 (which was initiated by a negative going clock pulse appearing at pin 9) whenever the signal at input pin 7 exceeds the device's internally generated reference. Thus, as configured, integrated circuit 305 while conventionally used as a multivibrator circuit is now, in accordance with the principles of this invention, operating as a high speed comparator for effecting pulse width modulation.

Figure 2A:
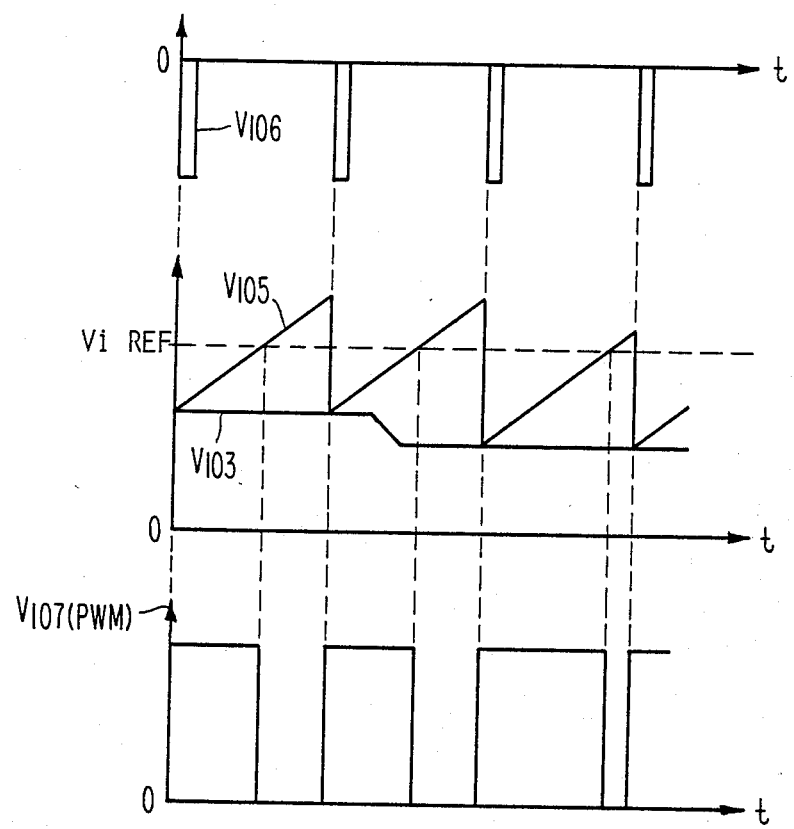
FIG. 2A is a waveform timing diagram setting forth the signal waveforms at pertinent locations of FIG. 1 and FIG. 3, when the circuit is configured in the voltage mode of operation.
Figure 2B:
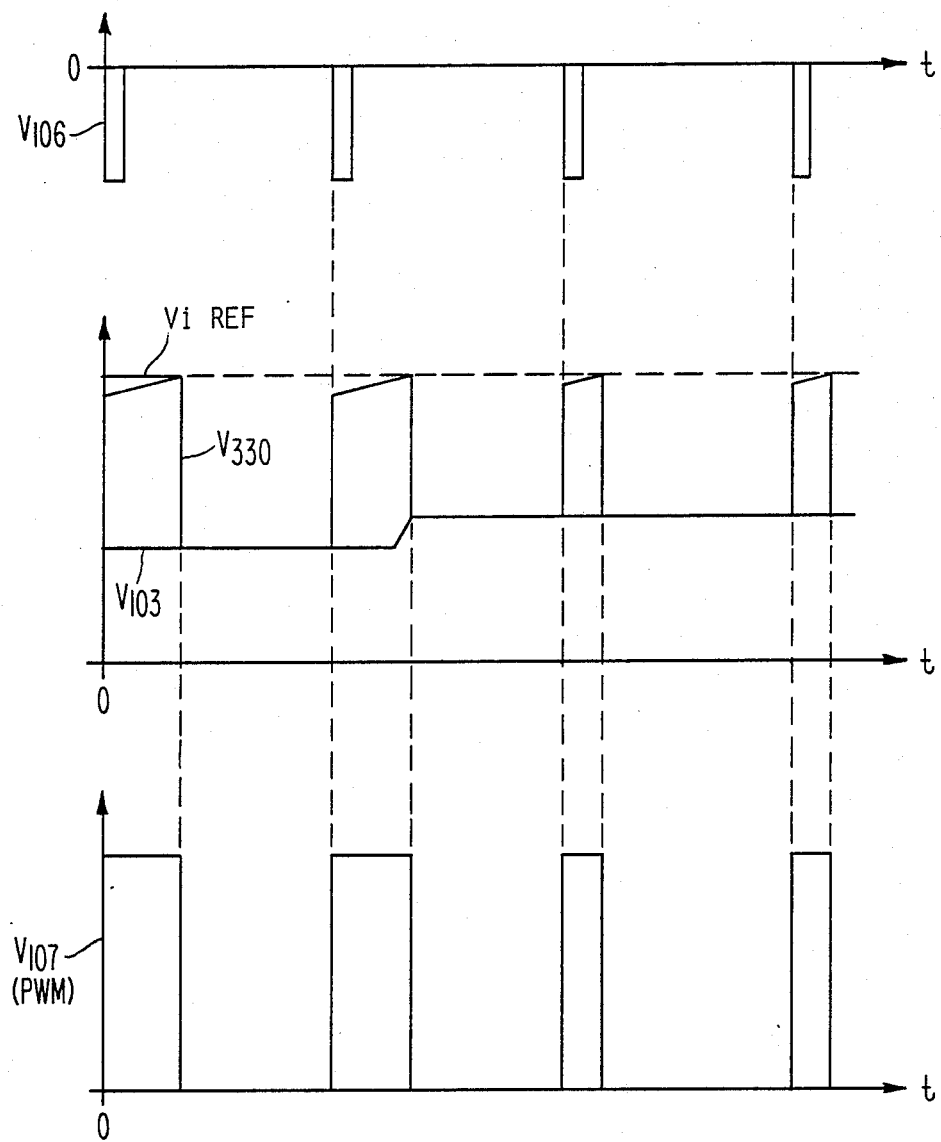
FIG. 2B is a waveform timing diagram depicting signal waveforms at pertinent locations shown in FIG. 1 and FIG. 3, when the circuit is configured in the peak current mode of operation.

The method of operation of the pulse width control arrangement described above in conjunction with FIGS. 1 and 3, may be explained in both optional modes of operation with respect to the timing diagram set forth in FIG. 2A and FIG. 2B.

For the voltage mode option of operation (option strap 300A of FIG. 3 installed), the voltage waveforms seen at pertinent points in the circuitry of FIG. 1 or FIG. 3 as set forth in relative timed relationship in FIG. 2A. As seen from FIG. 2A, each output pulse at lead 107 designated $V_{107}$ (PWM) is initiated at monostable multivibrator comparator 130 by the receipt of a clock pulse $V_{106}$ at input lead 106. Simultaneously, the clock pulse at lead 106 will initiate the ramp portion of the sawtooth waveform appearing at the output of ramp generator 120 at lead 104. The sawtooth ramp will be superimposed at summing node 329 (FIG. 3) upon the control voltage $V_{103}$ appearing at the output of error amplifier 110. The composite signal $V_{105}$ is presented to the input of high speed comparator 130 and at that point in time when the composite signal $V_{105}$ exceeds the internally generated reference signal of the integrated circuit monostable multivibrator, Viref, the output pulse $V_{107}$ will be terminated.

Also as seen from FIG. 2A, the width of the output pulse may be modulated from one cycle of operation to the next in accordance with any changes occurring to the level of the control signal appearing at lead 103. For example, in FIG. 2A, during the occurrence of the second output pulse $V_{107}$, assume, as shown, the level of the control voltage $V_{103}$ decreases indicating that the power supply output has fallen below a preselected level. Since $V_{103}$ is lower, the next initiation of an output pulse will start the ramp portion of the sawtooth at a lower relative level with respect to Viref, and therefore more time will be taken for the ramp voltage appearing on lead 105 to exceed the reference level internally generated by comparator 130. This, in turn, will lead to a wider pulse width at the output 107 tending to maintain the power switching components of the power supply in a state such that the output voltage will be changed in a manner tending to reduce the error between the power supply output and the desired reference level. The voltage mode of operation is typically used in those applications utilizing multichannel convertor, or switched mode, power supplies in master-slave arrangements.

In the peak current mode of operation (option strap 300B of FIG. 3 installed) the pertinent voltage signal wave forms are shown in time relationship in FIG. 2B. The peak current mode of operation is typically used in single channel power supplies and its use eliminates a pole of the complex transfer function of the regulation control loop, thereby leading to improved stabilization thereof. In the peak current mode of operation, the output of ramp generator 120 is not used directly to trigger the comparator 130 as it was in the case of voltage mode operation. Rather, in the peak current mode, the output of ramp generator 120 is used to minimize instability in operation of the pulse width modulation arrangement for applications requiring higher than a 50% duty cycle.

As seen in FIG. 2B, a voltage signal $V_{330}$ devloped across resistor 330 of FIG. 3 is superimposed on the control voltage $V_{103}$ and the variable superimposed signal formed at summing node 329 is compared to the internally generated reference voltage Viref of multivibrator comparator 130. As in the voltage mode of operation, it will be seen from FIG. 2B that the width of the output pulses $V_{107}$ will be varied in accordance with the level of the control signal $V_{103}$, as this control signal will determine how quickly $V_{330}$ will exceed the internal reference, with $V_{330}$ being proportional to the output current sensed from the main transformer winding of the power supply being regulated.

The invention has been described with reference to a description of a preferred embodiment. It is to be noted that the description is for the sake of example only and is not intended to limit the scope and spirit of the invention which is to be defined by the appended claims.

What is claimed is:

1. Apparatus for providing output signal pulses having variable time durations comprising:
   clock means for generating a series of pulses with each pulse defining the initiation of an output signal pulse;
   means for generating a control signal having a signal level which is related to a desired time duration for a given output signal pulse;
   waveform means, coupled to the clock means, for generating a periodic signal having a period defined by the pulse repetition rate of the series of pulses generated by the clock means;
   summing means, having first and second inputs respectively coupled to the means for generating a control signal and the waveform means, operative to superimpose the periodic signal upon the control signal at a summing means output; and
   a monostable multivibrator circuit having a triggering input coupled to the clock means and an input conventionally coupled to a passive resistance/capacitive time period defining network instead coupled to the summing means output, the monostable multivibrator operative as connected to produce the output signal pulses, each pulse having a time duration extending from receipt at the triggering input of a clock pulse to attainment by the summing means output of a signal level determined by internal characteristics of the monostable multivibrator.

2. Apparatus as set forth in claim 1 wherein the waveform means generates a saw-tooth periodic signal.

3. The apparatus of claim 2 wherein the means for generating a control signal comprises amplifier means having a first input coupled for receipt of a feedback signal, a second input coupled for receipt of a reference level, and an output carrying the control signal which is proportional to a difference between the feedback signal and the reference level.

4. The apparatus of claim 3 further comprising means for generating a peak current mode signal, the peak current mode signal coupled to a third input of the summing means.

5. The apparatus of claim 4 wherein the means for generating the peak current mode signal comprises a current sensing winding, and resistance means coupled to the current sensing winding for generating a peak current mode signal as a function of current flowing through the current sensing winding.

6. In a pulse width modulation circuit, the modulation effected by initiating a pulse with a signal from clock pulse train generating means, generating an error signal by comparing a monitored output to a first reference level, generating a control signal from the comparison results, superimposing a periodically increasing waveform upon the control signal to form a superimposed signal, comparing the superimposed signal with a second reference level, and terminating a pulse whenever the superimposed signal exceeds the second reference level, the improvement comprising:

using a retriggerable, monostable multivibrator circuit having a variable activation time as means for comparing the superimposed signal with the second reference level by coupling the superimposed signal to an input of the multivibrator normally coupled to an external resistance-capacitance network for setting the activation time of the monostable circuit, the multivibrator operative as connected to internally generate the second reference level and to terminate a multivibrator output whenever the superimposed signal exceeds the internally generated reference level.

7. The improvement of claim 6 wherein the monostable multivibrator comprises a commercially available integrated circuit having an input conventionally designated in the semiconductor industry As "$R_{EXT}/C_{EXT}$", coupled for receipt of the superimposed signal, an input conventionally designated "A" coupled to the clock pulse train generating means, inputs conventionally designated "$V_{CC}$", "B" and "CLR" each coupled to a source of positive bias voltage, inputs conventionally designated "$C_{EXT}$" and "GND" each coupled to a source of ground potential, and an output conventionally designated "Q" serving as a source of modulated output pulses.

8. The improvement of claim 7 wherein the integrated circuit comprises type 74123.

9. The improvement of claim 6 wherein the monostable multivibrator comprises one of two multivibrators packaged in integrated circuit type SN74LS123, the integrated circuit package having pin 1 coupled for receipt of the clock pulse train, pin 15 coupled for receipt of the superimposed signal, pins 16, 2 and 3 each coupled to a source of positive bias voltage, pins 14 and 8 each coupled to ground potential, and pin 13 serving as the source of modulated output pulses.

10. The improvement of claim 6 wherein the monostable multivibrator comprises one of two multivibrators packaged in integrated circuit type SN74LS123, the integrated circuit package having pin 9 coupled for receipt of the clock pulse train, pin 7 coupled for receipt of the superimposed signal, pins 16, 10 and 11 each coupled to a source of positive bias voltage, pins 6 and 8 each coupled to ground potential, and pin 5 serving as the source of modulated output pulses.

* * * * *